United States Patent [19]

Kawakami et al.

[11] Patent Number: 4,805,035

[45] Date of Patent: Feb. 14, 1989

[54] COLOR VIDEO AND AUDIO RECORDING AND/OR REPRODUCING APPARATUS

[75] Inventors: Hiroshi Kawakami, Tokyo, Japan; Takato Narita, Grenrock, N.J.

[73] Assignee: Sony Corporation, Tokyo, Japan

[21] Appl. No.: 34,022

[22] Filed: Apr. 3, 1987

[30] Foreign Application Priority Data

Apr. 9, 1986 [JP] Japan .................................. 61-81617

[51] Int. Cl.[4] .............................................. G03B 9/79
[52] U.S. Cl. ................................................... 358/310
[58] Field of Search ............... 358/310, 330, 334, 340, 358/341, 343; 360/19.1

[56] References Cited

U.S. PATENT DOCUMENTS

| | | | |
|---|---|---|---|
| 4,492,986 | 1/1985 | Kono et al. | 358/330 |
| 4,527,203 | 7/1985 | Kamai | 360/19.1 |
| 4,672,470 | 6/1987 | Morimoto et al. | 360/19.1 X |
| 4,725,896 | 2/1988 | Ohira et al. | 358/330 |
| 4,743,977 | 5/1988 | Yoshioka et al. | 358/310 |
| 4,763,206 | 8/1988 | Takahashi et al. | 358/343 X |

Primary Examiner—W. B. Perkey
Attorney, Agent, or Firm—Alvin Sinderbrand

[57] ABSTRACT

In an apparatus for recording, in successive parallel tracks on a record medium, an audio signal and a color video signal comprised of a luminance signal and a chrominance signal constituted by at least two chrominance signal components, and in which the luminance and chrominance signals are recorded in alternate tracks, respectively, with the chrominance signal components being time-base-compressed and time-division-multiplexed so as to be arranged alternately in sequence in the respective tracks; the audio signal frequency modulates at least one carrier to provide a first frequency modulated output in a predetermined frequency band, the time-base-compressed and time-division-multiplexed chrominance signal components frequency modulate a second carrier to provide a second frequency modulated output in a frequency band above the predetermined frequency band of the first frequency modulated output, the first and second frequency modulated outputs are combined, as in an adder or mixer, the luminance signal is processed, for example, in a frequency modulator, and then supplied to first recording heads for recording in the respective ones of the alternate tracks, and second recording heads receive the combined first and second frequency modulated outputs for recording in the others of the alternate tracks.

11 Claims, 5 Drawing Sheets

FIG. 3A
(PRIOR ART)
FIG. 3B
(PRIOR ART)
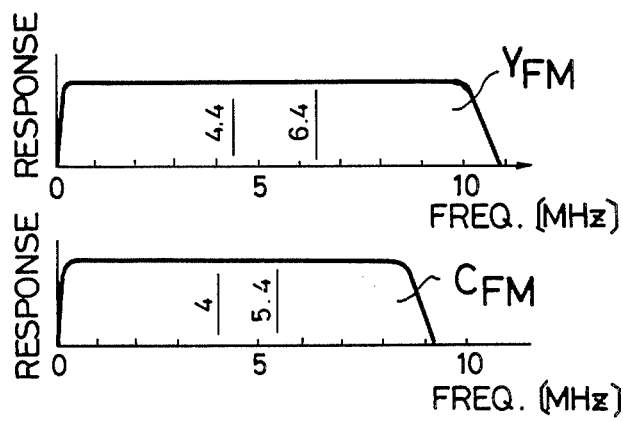
FIG. 4A
(PRIOR ART)
FIG. 4B
(PRIOR ART)
FIG. 4C
(PRIOR ART)
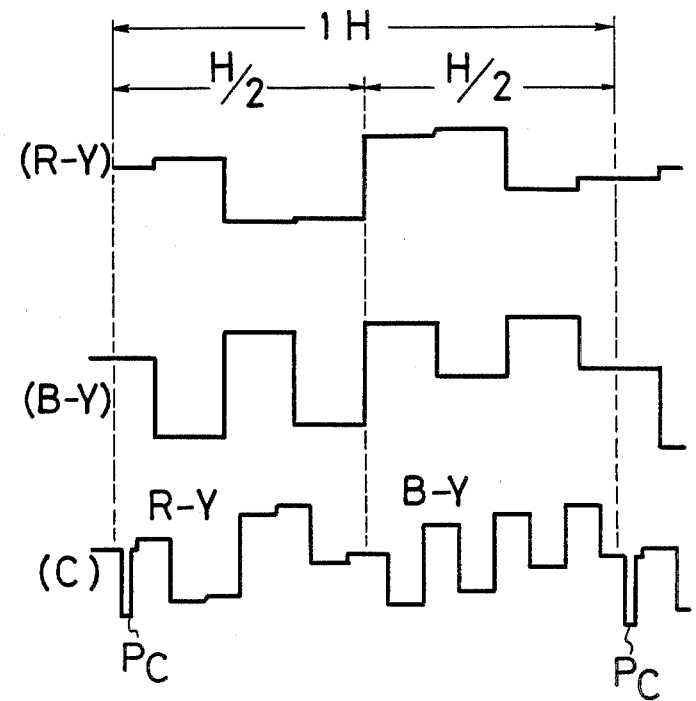

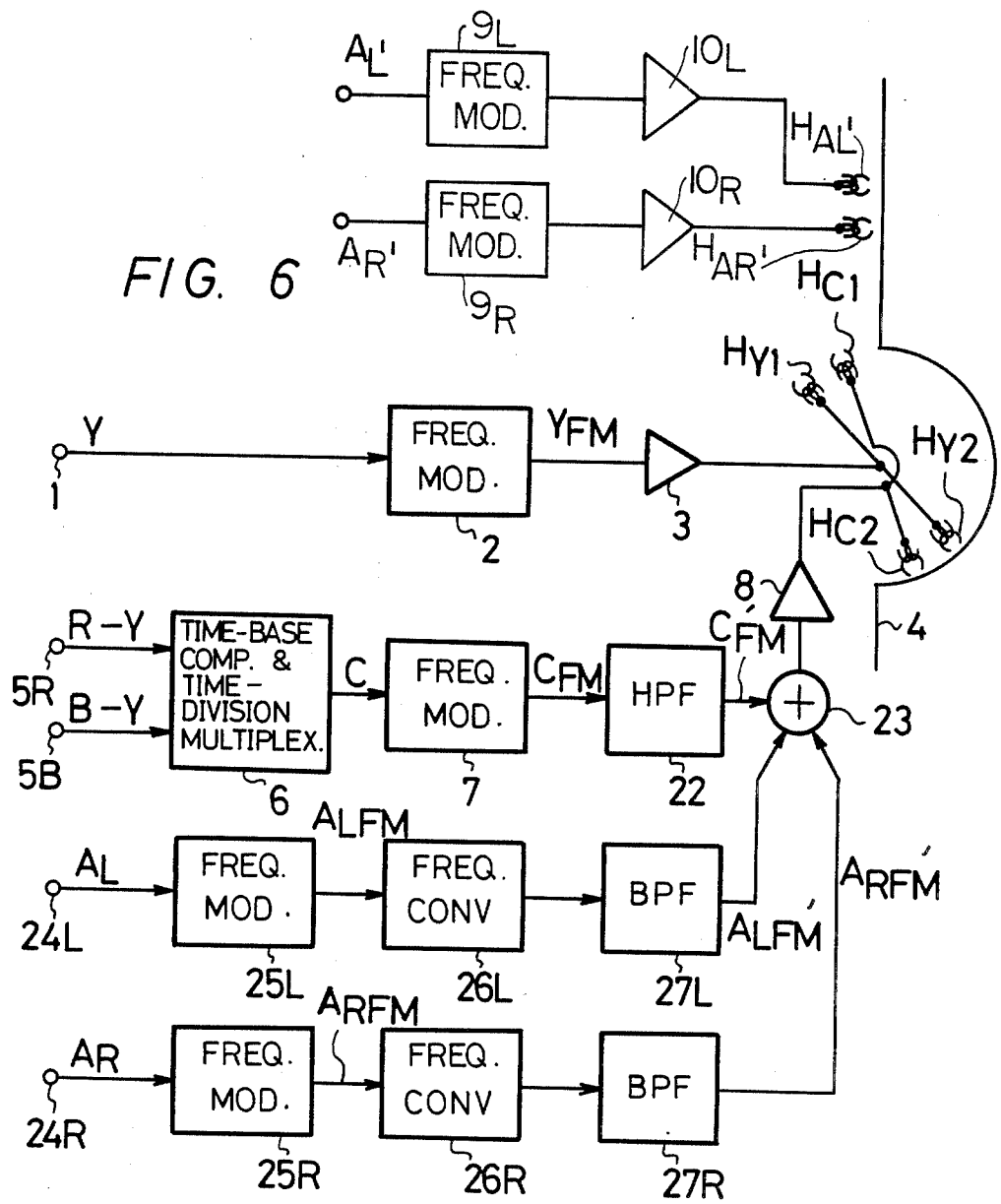
FIG. 6
FIG. 7
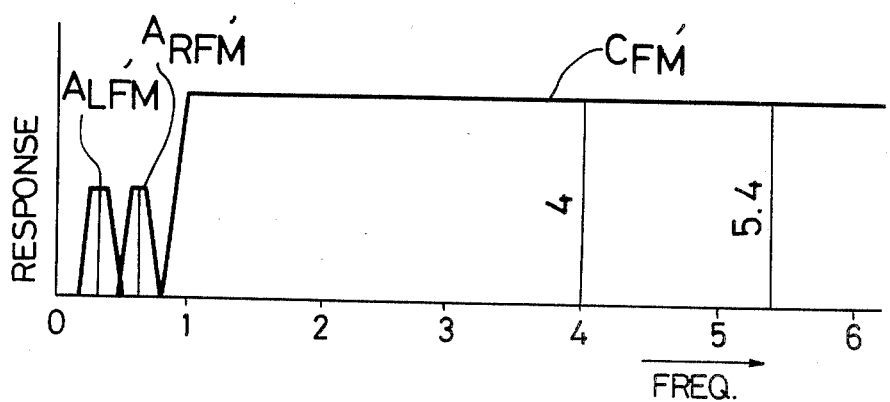

COLOR VIDEO AND AUDIO RECORDING AND/OR REPRODUCING APPARATUS

BACKGROUND OF THE INVENTION

1. Field of the Invention

This invention relates generally to a magnetic recording and/or reproducing apparatus, such as, a video tape recorder or VTR, and more particularly is directed to improving the recording of audio in such apparatus of the type in which luminance and chrominance signals comprising a color video signal are recorded in separate tracks.

2. Description of the Prior Art

Color television or video signals according to the NTSC standard include a luminance signal and a chrominance signal comprised of components quadrature-modulated on a color subcarrier. When it is desired to record such an NTSC color video signal in a VTR, it is found that the total band width of the NTSC signal is so large that side bands of the frequency-modulated carrier extend over a greater frequency band than that which can be accommodated within the FM channel of the VTR. Consequently, the so-called "color under" system has been used in which the color subcarrier, quadrature-modulated with the chrominance signal components, is directly recorded at a relatively low frequency in the same track with an FM carrier modulated by the luminance signal. While the "color under" system allows recording of a color video signal on a single track of a magnetic tape in a VTR, certain problems are associated therewith, such as, poor signal/noise ratio in respect to the chrominance signal, cross-talk between the two quadrature-modulated chrominance signal components, and a limited frequency band width. Further, the FM luminance carrier cannot be modulated to its fullest extent because of possible saturation of the recording medium leading to distortion of the directly recorded chrominance signal. Further, many existing VTRs are burdened by relatively low fidelity reproduction of the audio signals associated with the recorded color video signal. In such VTRs, audio signals are recorded and reproduced by fixed magnetic heads in tracks extending longitudinally along the magnetic tape, while the color video signal is recorded by rotary heads in tracks extending obliquely across the tape. Due to the relatively slow speed of movement of the tape in the longitudinal direction during recording and reproducing operations, the audio signals recorded and reproduced by fixed heads are inherently of relatively poor quality, and such poor quality is only marginally improved by frequency modulating the audio signal for the recording thereof.

In order to improve the quality of the recorded audio signal, it has been proposed, for example, as disclosed in detail in U.S. Pat. No. 4,490,751, having a common assignee herewith, to provide a video and audio signal recording apparatus in which a first audio signal, for example, a stereophonic left-channel signal, frequency modulates first and second carriers, thereby providing first and second FM audio signals, respectively, while third and fourth carriers are frequency modulated by a second audio signal, for example, a stereophonic right-channel signal, for providing third and fourth FM audio signals, respectively, with such first to fourth carriers all having different respective frequencies. Two of the FM audio signals which represent the first and second audio signals to be recorded, respectively, are mixed with a video signal for providing a first mixed audio and video signal, and the other two FM audio signals are mixed with the video signal to provide a second mixed audio and video signal, whereupon, first and second magnetic heads having different azimuth angles receive the first and second mixed audio and video signals for recording such first and second mixed signals in respective record tracks which are adjacent each other on the magnetic tape. In a preferred arrangement of the foregoing video and audio signal recording apparatus, when the video signal to be recorded is a color video signal including a luminance signal and chrominance signal components, the luminance signal frequency modulates an additional carrier having a frequency higher than that of all the carriers of the FM audio signals so that the resulting FM luminance signal is in a band above the band containing the first through fourth FM audio signals, and the chrominance signal is frequency converted to a relatively low frequency band spaced from the band of the FM luminance signal for providing a gap therebetween in which all of the FM audio signals are situated. Since, in this arrangement, the FM audio signals are recorded and reproduced by the rotary heads in the oblique tracks on the magnetic tape, a high head-to-tape speed is attained and the quality of the recorded and reproduced audio signals is improved. However, since the chrominance and luminance signals of the color video signal are recorded in the same track, the previously mentioned problems associated with such arrangement are still encountered, and are even accentuated by the fact that the band widths available for recording the luminance and chrominance signals are further limited by the need to provide a gap therebetween for accommodating the FM audio signals.

In order to improve the quality of the recorded and reproduced color video signal, it has been proposed, for example, in U.S. Pat. No. 4,376,957, issued Mar. 15, 1983, and in U.S. Pat. No. 4,580,173, issued Apr. 1, 1986, to provide a VTR for recording a color video signal comprised of a luminance signal and a chrominance signal constituted by at least two chrominance signal components, and in which the luminance and chrominance signals are recorded by respective rotary heads in alternate slant tracks, respectively, extending obliquely across the magnetic tape, with the chrominance signal components being time-base-compressed and time-division-multiplexed so as to be arranged alternately in sequence in the respective tracks. By thus recording the luminance and chrominance signals in separate tracks, the quality of the recorded and reproduced color video signal is substantially enhanced. However, in existing proposals for recording the luminance and chrominance signals in separate slant tracks, the audio signals are still recorded in tracks extending longitudinally along the magnetic tape by means of fixed heads so that the head-to-tape speed is very low with the result that the reproduced audio signals are of poor quality which is not sufficiently improved by recording frequency modulated audio signals.

OBJECTS AND SUMMARY OF THE INVENTION

Accordingly, it is an object of the present invention to provide an apparatus, such as, a VTR, for effecting high quality recording and reproducing of both color video and audio signals.

More specifically, it is an object of this invention to provide a recording and reproducing apparatus, as aforesaid, in which luminance and chrominance signals are recorded in separate slant tracks extending obliquely across the tape and being scanned by respective rotary heads, and the audio signals are also recorded in slant tracks by rotary heads so that the audio signals can be recorded and reproduced with high fidelity.

It is still another object of this invention to provide a recording and reproducing apparatus, as aforesaid, in which the audio signals are frequency-multiplexed with the chrominance signal at the lower side of the frequency band of the chrominance signal and are recorded in the same slant tracks as the chrominance signal by means of the rotary heads which record the latter.

In accordance with an aspect of this invention, in an apparatus for recording, in successive parallel tracks on a record medium, an audio signal and a color video signal comprised of a luminance signal and a chrominance signal constituted by at least two chrominance signal components, and in which the luminance and chrominance signals are recorded in alternate tracks, respectively, with the chrominance signal components being time-base-compressed and time-division-multiplexed so as to be arranged alternately in sequence in the respective tracks; first frequency modulating means frequency modulates at least one carrier by the audio signal and provides a first frequency modulated output in a predetermined frequency band, second frequency modulating means frequency modulates a second carrier by the time-base-compressed and time-division-multiplexed chrominance signal components and provides a second frequency modulated output in a frequency band above the predetermined frequency band of the first frequency modulated output, the luminance signal is processed, for example, frequency modulated, and applied to first recording means for recording in the respective ones of the alternate tracks, mixing means combine the first and second frequency modulated outputs, and second recording means receive the combined first and second frequency modulated outputs from the mixing means for recording in the others of the alternate tracks.

The above, and other objects, features and advantages of the invention, will be apparent in the following detailed description of an illustrative embodiment of the invention which is to be read in connection with the accompanying drawings wherein the same or corresponding parts are identified by the same reference numerals in the several views.

BRIEF DESCRIPTION OF THE DRAWINGS

FIGS. 3A and 3B respectively illustrate frequency spectrums of the luminance and chrominance signals as recorded in respective separate tracks by the apparatus of FIG. 1;

FIGS. 4A, 4B and 4C respectively show examples of the waveforms of two chrominance signal components and of the result of the time-base-compressing and time-division-multiplexing of such chrominance signal components in the apparatus of FIG. 1;

FIG. 6 is a block diagram of the recording section of an apparatus according to an embodiment of the present invention for recording and reproducing color video and audio signals;

FIG. 7 shows the spectrum of the chrominance and audio signals as recorded in a common track by the apparatus of FIG. 6 in accordance with the present invention.

DESCRIPTION OF A PREFERRED EMBODIMENT

Figure 1:
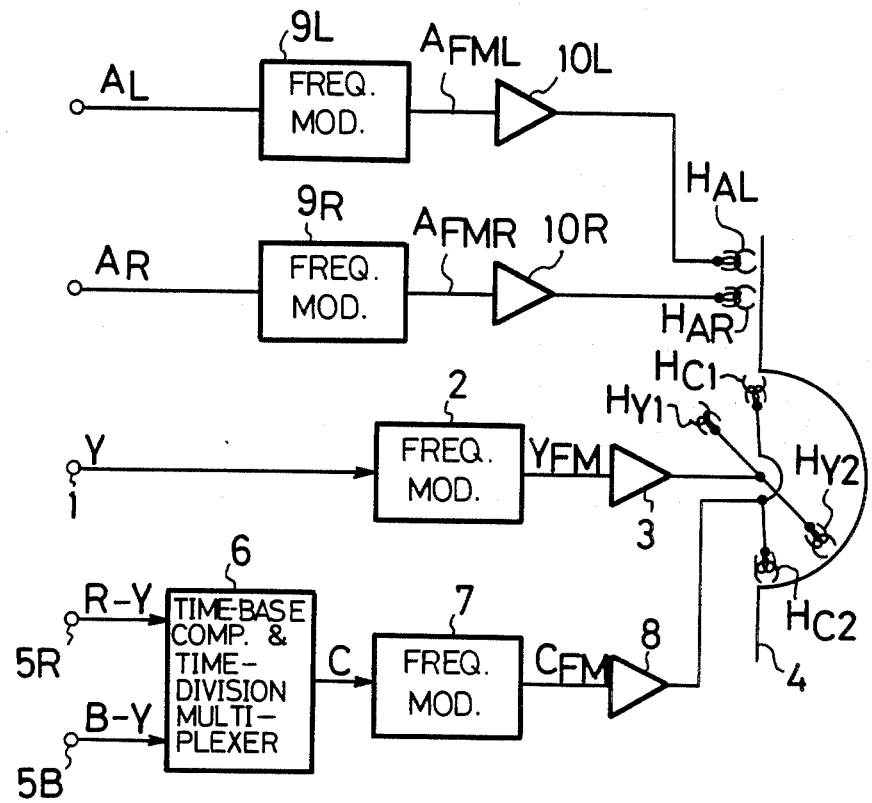
FIG. 1 is a block diagram illustrating the recording section of an apparatus according to the prior art for recording and reproducing color video and audio signals.
Figure 2:
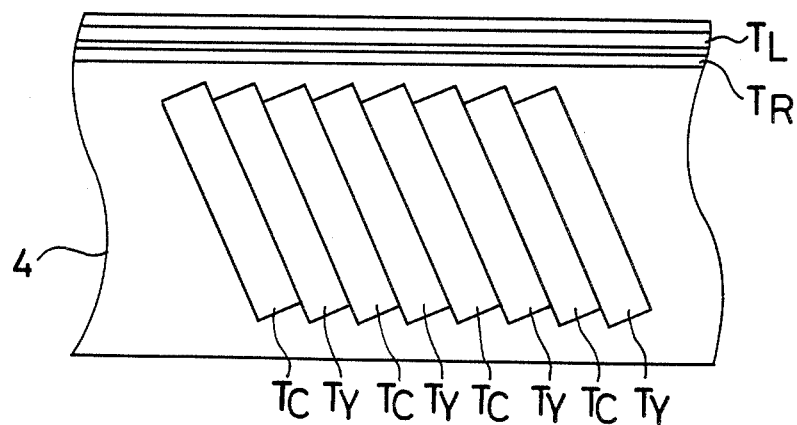
FIG. 2 is a diagrammatic plan view illustrating a section of magnetic tape on which color video and audio signals have been recorded by the apparatus of FIG. 1.

Referring to the drawings in detail, and initially to FIG. 1 for obtaining a better understanding of the problems solved by the present invention, it will be seen that, in a VTR according to the prior art, for example, as disclosed in detail in the previously mentioned U.S. Pat. Nos. 4,376,957 and 4,580,173, the color video signal to be recorded is comprised of a luminance signal Y and chrominance signal components, for example, in the form of color difference signals R-Y and B-Y, as shown, although I and Q signals could be employed in their stead. The luminance signal Y and color difference signals R-Y and B-Y are, for example, produced by a television camera (not shown). The luminance signal Y is received at a terminal 1 and supplied therefrom to a frequency modulator 2 for frequency modulating a suitable carrier. For example, the frequency modulation by the luminance signal Y may be performed with the sync tip at 4.4 MHz and the white peak at 6.4 MHz, so as to provide the resulting frequency modulated luminance signal $Y_{FM}$ with the frequency spectrum shown in FIG. 3A. Such frequency modulated luminance signal $Y_{FM}$ is supplied through an amplifier 3 to a first pair of rotary magnetic heads $H_{Y1}$ and $H_{Y2}$ which are diametrically opposed or spaced from each other by about 180°. The rotary heads $H_{Y1}$ and $H_{Y2}$ alternately scan a magnetic tape 4 which is wrapped helically about at least a portion of the periphery of a guide drum (not shown) associated with the rotary heads so that the heads $H_{Y1}$ and $H_{Y2}$ will each form a slant or oblique track $T_Y$ across the tape, with each track $T_Y$ having recorded therein the luminance signal information corresponding to a respective field of the color video signal (FIG. 2). During the recording operation, tape 4 is longitudinally transported at a sufficient speed so that successive tracks $T_Y$ are spaced from each other.

The color difference signals R-Y and B-Y are supplied through terminals 5R and 5B to a circuit 6 which effects time-base-compressing and time-division-multiplexing of the color difference signals. More specifically, the color difference signals R-Y and B-Y, for example, originally having the waveforms shown on FIGS. 4A and 4B, respectively, are compressed to one-half their original time base and then time-division-multiplexed or arranged alternately in sequence, as shown on FIG. 4C. In other words, the time-compressed chrominance signal component R-Y originally having a duration of one horizontal period (1H) is timed to occur in the first half of one horizontal period (1H), while the time-compressed chrominance signal component B-Y is timed to occur in the second half of such horizontal period. The circuit 6 further inserts a reference pulse $P_C$ equivalent to the horizontal synchronizing pulse of the luminance signal Y, and which is inserted in each horizontal period of the time-base-compressed and time-division-multiplexed color difference signals C at a time corresponding to the timing of the horizontal synchronizing pulse in the luminance signal.

The time-base-compressed and time-division-multiplexed color difference signal C issuing from circuit 6 is supplied to a frequency modulator 7 for frequency modulating a carrier thereby. By way of example, such frequency modulation is performed so that the white peak is at 4.0 MHz and the sync tip is at 5.4 MHz. The resulting frequency modulated color difference signal $C_{FM}$ obtained from frequency modulator 7 and having the frequency spectrum shown on FIG. 3B is supplied through an amplifier 8 to a pair of rotary magnetic heads $H_{C1}$ and $H_{C2}$ that are angularly spaced from each other by about 180° and that are disposed adjacent to the heads $H_{Y1}$ and $H_{Y2}$, respectively, in the rotational direction. Further, heads $H_{C1}$ and $H_{C2}$ are axially positioned relative to heads $H_{Y1}$ and $H_{Y2}$ so that, in response to rotation of the heads, heads $H_{C1}$ and $H_{C2}$ will alternately scan magnetic tape 4 along slant or oblique tracks $T_C$ interposed between the tracks $T_Y$ scanned by heads $H_{Y1}$ and $H_{Y2}$. In other words, as shown on FIG. 2, the frequency modulated luminance signal $Y_{FM}$ and the frequency modulated color difference signal $C_{FM}$ are recorded in alternate tracks $T_Y$ and $T_C$, with each track $T_Y$ containing the frequency modulated luminance signal for one field of the color video signal, while each track $T_C$ similarly contains the frequency modulated time-base-compressed and time-division-multiplexed color difference signals R-Y and B-Y for one field of the color video signal.

As shown on FIG. 1, in the known VTR for recording the frequency modulated luminance signal $Y_{FM}$ and the frequency modulated color difference signal $C_{FM}$ in separate tracks, audio signals, such as, a stereophonic left-channel signal $A_L$ and a stereophonic right-channel signal $A_R$ are supplied to frequency modulators $9_L$ and $9_R$ for frequency modulating suitable carriers and providing frequency modulated audio signals $A_{FML}$ and $A_{FMR}$, respectively. Such frequency modulated audio signals $A_{FML}$ and $A_{FMR}$ are passed through respective recording amplifiers $10_L$ and $10_R$ to fixed heads $H_{AL}$ and $H_{AR}$, respectively, for recording by such fixed heads in tracks $T_L$ and $T_R$ extending longitudinally along tape 4, as shown on FIG. 2.

Figure 5:
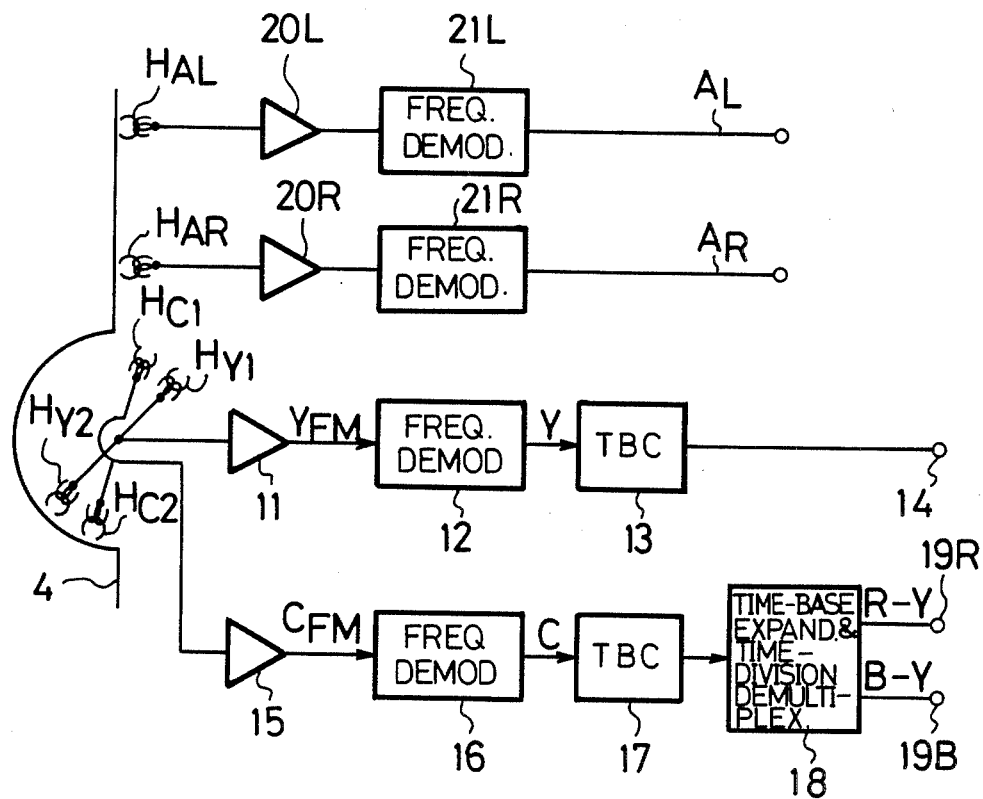
FIG. 5 is a block diagram showing the reproducing section of the apparatus according to the prior art for reproducing the color video and audio signals recorded by the apparatus of FIG. 1.

Referring now to FIG. 5, it will be seen that, in the reproducing section of the known apparatus, the reproduced frequency modulated luminance signal $Y_{FM}$ from rotary heads $H_{Y1}$ and $H_{Y2}$ is supplied through an amplifier 11 to a frequency demodulator 12. The resulting demodulated luminance signal Y has its time base corrected in a time-base corrector (TBC) 13 prior to being supplied to a luminance output terminal 14. The frequency modulated color difference signal $C_{FM}$ reproduced by heads $H_{C1}$ and $H_{C2}$ is supplied through an amplifier 15 to a frequency demodulator 16 so as to provide therefrom the reproduced time-base-compressed and time-division-multiplexed color difference signals C which are applied to a time-base corrector 17. The output of time-base corrector 17 is applied to a time-base-expanding and time-division-demultiplexing circuit 18 which provides the corresponding color difference signals R-Y and B-Y simultaneously at output terminals 19R and 19B, respectively.

The reproducing section of the known apparatus is further shown on FIG. 5 to include reproducing amplifiers $20_L$ and $20_R$ which amplify the audio signals reproduced by fixed heads $H_{AL}$ and $H_{AR}$ from the respective longitudinal tracks $T_L$ and $T_R$. The outputs of amplifiers $20_L$ and $20_R$ are supplied to frequency demodulators $21_L$ and $21_R$ by which the reproduced audio signals $A_L$ and $A_R$ are provided to suitable output terminals. Since the heads $H_{AL}$ and $H_{AR}$ for recording and reproducing the stereophonic left-channel audio signal $A_L$ and the stereophonic right-channel audio signal $A_R$ in longitudinal tracks $T_L$ and $T_R$, respectively, are fixed, such recording and reproducing is effected with a low head-to-tape speed so that the reproduced signals are of poor quality or low fidelity even though the audio signals are frequency modulated for recording.

Generally, in accordance with the present invention, high fidelity audio recording is achieved in a VTR which records and reproduces a color video signal substantially in the manner described above with reference to FIGS. 1 and 5. More particularly, such high fidelity audio recording and reproducing is effected by rotary magnetic heads which move at a high speed relative to the magnetic tape, and without increasing the number of rotary heads required in the apparatus. More specifically, in an apparatus according to this invention, the frequency modulated luminance signal $Y_{FM}$ and the frequency modulated color difference signal $C_{FM}$ are recorded in alternate tracks $T_Y$ and $T_C$ by heads $H_{Y1}$ and $H_{Y2}$ and by heads $H_{C1}$ and $H_{C2}$, respectively, as described above with reference to FIG. 1, while the audio signals are frequency-multiplexed or combined with that portion of the color video signal to be recorded in one of the tracks $T_Y$ or $T_C$, and the resulting combined signal is recorded in that one track by the respective rotary head.

Since the quality of the reproduced video picture is mainly determined by the luminance signal, in the apparatus according to the present invention, the frequency modulated audio signal or signals are recorded only in the tracks $T_C$ containing the chrominance signal whereby to avoid any interference with or additional processing of the luminance signal. Further, since the frequency deviation of the frequency modulated color difference signal $C_{FM}$ is from about 4 MHz to 5.4 MHz and the frequency band of the time-compressed color difference signal C is 3 MHz, the first order lower side band component of the frequency modulated color difference signal extends 3.0 MHz from 4.0 MHz (white peak) to about 1.0 MHz with the region below the latter being available for recording the frequency modulated audio signal or signals. As compared with the latter, the first order lower side band component of the frequency modulated luminance signal extends about 4.0 MHz below 4.4 MHz (sync. tip) so that at the most only 0.4 MHz would be available to receive the frequency modulated audio signal or signals if frequency multiplexed with the luminance signal for recording in the tracks $T_Y$.

When the frequency modulated audio signal or signals are frequency-multiplexed with the frequency modulated color difference signal $C_{FM}$ for recording with the latter in the tracks $T_C$ in accordance with this invention, the full 1.0 MHz band width below the first order lower side band component of the chrominance signal $C_{FM}$ is not completely available for the audio signal or signals. Thus, from the standpoint of practically achieving convenient demultiplexing or separation of the frequency modulated audio signal or signals from the frequency modulated color difference signal by means of practical filters or the like, the upper frequency limit for the frequency modulated audio signals is about 800 kHz. Further, the lower frequency limit of the frequency modulated audio signals to be multiplexed with the frequency modulated color difference signal $C_{FM}$ is determined by the high pass characteristic of a rotary transformer (not shown in FIGS. 1 and 5) by which signals are transmitted between the rotary heads $H_{C1}$ and $H_{C2}$ and the fixed elements of the respective circuits. For example, the lower frequency limit for the frequency modulated audio signals is about 150 kHz so that the frequency band of the frequency modulated audio signals t be multiplexed with the frequency modulated color difference signal $C_{FM}$ in accordance with this invention is from about 150 kHz to about 800 kHz.

If two channels of audio signals, for example, the stereophonic left-channel audio signal $A_L$ and the stereophonic right-channel audio signal $A_R$ are to be provided within the frequency band from about 150 kHz to 800 kHz, and cross modulation is to be allowed for, the channel for the stereophonic left audio signal $A_L$ may be 334.35 kHz (that is, $21.25 \times f_H$, in which $f_H$ is the horizontal frequency) $\pm 150$ kHz, while the channel for the stereophonic right audio signal $A_R$ is selected to be 633.30 kHz (40.25 $f_H$) $\pm 150$ kHz. Since the frequency band occupied by a frequency modulated signal is about twice the maximum modulation frequency, the frequency deviation employed in modulating the frequency of a carrier by the left and right audio signals $A_L$ and $A_R$ is selected to be 150 kHz/2 = 75 kHz. Moreover, a desirable recording current value for the frequency modulated audio signals has been experimentally determined to be about $-24$ dB relative to the recording current for the frequency modulated color difference signal, that is, the frequency modulated color difference signal $C_{FM}$ is recorded at a substantially higher level than the frequency modulated audio signal or signals frequency-multiplexed therewith for recording in the same tracks $T_C$ in accordance with this invention.

The recording and reproducing sections of an apparatus for recording and reproducing color video and audio signals in accordance with this invention will now be described in detail with reference to FIGS. 6 and 8, respectively, in which the parts or components corresponding to those described with reference to FIGS. 1 and 5, respectively, are identified by the same reference numerals and may not be further described.

In the recording section of FIG. 6, it will be seen that the frequency modulated color difference signal $C_{FM}$ from frequency modulator 7 is supplied to a high-pass filter 22 which passes only those frequencies above 1 MHz, that is, frequencies above the upper end of the band width in which the audio signals are to be accommodated. The frequency modulated color difference signal $C'_{FM}$ (FIG. 7) at the output of high-pass filter 22 is supplied to one input of an adder or mixer 23.

The stereophonic left-channel audio signal $A_L$ is supplied through a terminal $24_L$ to a frequency modulator $25_L$ in which, for example, the signal $A_L$ modulates the frequency of a carrier having a central frequency of 1.53 MHz with the maximum frequency deviation being limited to $\pm 75$ kHz. The frequency modulated audio signal $A_{LFM}$ from modulator $25_L$ is supplied to a frequency converter $26_L$ in which its carrier frequency is frequency-converted to 334.35 kHz (21.25 $f_H$). The output from frequency converter $26_L$ is supplied to a band-pass filter $27_L$ which has a pass-band of 334.35 kHz $\pm 150$ kHz. The frequency modulated audio signal $A'_{LFM}$ that issues from band-pass filter $27_L$, and whose frequency spectrum is shown on FIG. 7, is supplied to another input of adder or mixer 23.

The stereophonic right-channel audio signal $A_R$ is supplied through a terminal $24_R$ to a frequency modulator $25_R$ in which it modulates the frequency of a carrier having a central frequency of 1.83 MHz with the maximum frequency deviation being limited to $\pm 75$ kHz. The resulting frequency modulated audio signal $A_{RFM}$ from modulator $25_R$ is supplied to a frequency converter $26_R$ in which the carrier frequency is converter to 633.30 kHz (40.25 $f_H$). The resulting frequency converted signal is supplied to a band-pass filter $27_R$ which has a pass band of 633.30 kHz $\pm 150$ kHz, and the frequency modulated audio signal $A'_{RFM}$ passing through filter $27_R$ and having the frequency spectrum shown on FIG. 7 is supplied to another respective input of adder 23.

Adder or mixer 23 provides a frequency multiplexed, combined or composite signal comprised of frequency modulated color difference signal $C'_{FM}$ and frequency modulated audio signals $A'_{LFM}$ and $A'_{RFM}$. The frequency multiplexed, combined signal from adder 23 is supplied through recording amplifier 8 to rotary heads $H_{C1}$ and $H_{C2}$ for recording by the latter in tracks $T_C$ on magnetic tape 4. In combining the frequency modulated audio signals $A'_{LFM}$ and $A'_{RFM}$ and the frequency modulated color difference signal $C'_{FM}$, the relative levels thereof are selected so that the recording currents of frequency modulated audio signals $A'_{LFM}$ and $A'_{RFM}$ will be about $-24$ dB relative to the recording current of frequency modulated color difference signal $C'_{FM}$.

Figure 8:
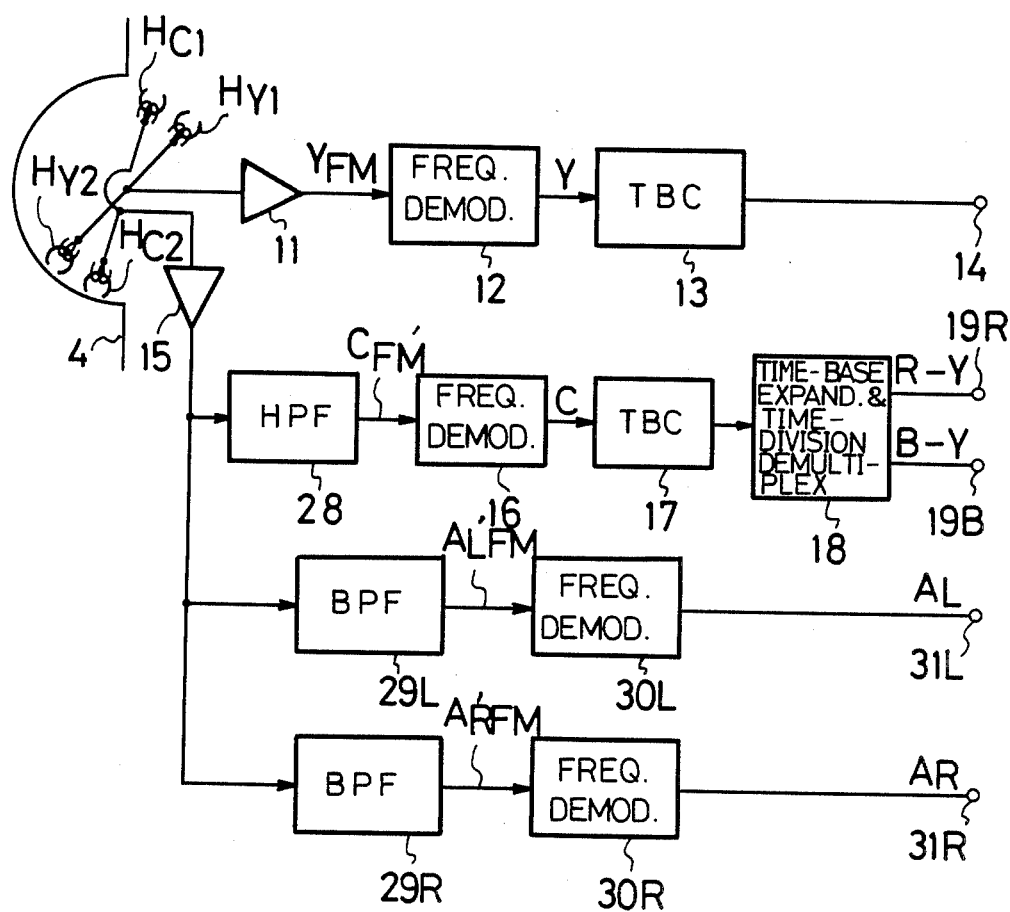
FIG. 8 is a block diagram showing the reproducing section of an apparatus according to this invention for reproducing the color video and audio signals recorded by the apparatus of FIG. 6.

Referring now to FIG. 8, it will be seen that, in the reproducing section of the apparatus according to this invention, the combined or composite signal comprised of frequency modulated color difference signal $C'_{FM}$ and frequency modulated audio signals $A'_{LFM}$ and $A'_{RFM}$ reproduced from each record track $T_C$ by one or the other of the rotary heads $H_{C1}$ and $H_{C2}$ is supplied through amplifier 15 to a high-pass filter 28. The high-pass filter 28 separates the frequency modulated color difference signal $C'_{FM}$ from the reproduced combined signal and supplies it to the frequency demodulator 16, whereupon the resulting demodulated color difference signal C is time-base corrected in circuit 17, and then time-base-expanded and time-division-demultiplexed in circuit 18 so as to simultaneously provide the color difference signals R-Y and B-Y at output terminals 19R and 19B in the same manner as was described in detail with reference to FIG. 5.

The combined signal from amplifier 15 is also supplied to a band-pass filter $29_L$ having a pass band of 334.35 kHz $\pm 150$ kHz. Thus, band pass filter $29_L$ separates the frequency modulated audio signal $A'_{LFM}$ from the combined signal and supplies the separated signal to a frequency demodulator $30_L$. Thus, the stereophonic left-channel audio signal $A_L$ is derived from demodulator $30_L$ and is supplied to an output terminal $31_L$. Similarly, the combined signal from amplifier 15 is supplied to a band-pass filter $29_R$ having a pass band of 633.30 kHz $\pm 150$ kHz, and by which the frequency modulated audio signal $A'_{RFM}$ is separated from the reproduced combined signal. The output of band-pass filter $29_R$ is supplied to a frequency demodulator $30_R$ for deriving therefrom the stereophonic right-channel audio signal $A_R$ which is supplied to an output terminal $31_R$.

Thus, in the described apparatus according to the invention, the audio signals $A_L$ and $A_R$ are frequency modulated on suitable carriers and recorded in slant tracks $T_C$ on magnetic tape 4 by the rotary heads $H_{C1}$ and $H_{C2}$ which are also operative to reproduce such signals. Since heads $H_{C1}$ and $H_{C2}$ are moved at a high speed relative to magnetic tape 4, it is possible to record and reproduce the audio signals with high fidelity. Further, since the frequency modulated audio signals $A'_{LFM}$ and $A'_{RFM}$ are frequency multiplexed with the frequency modulated color difference signal $C'_{FM}$ at the lower frequency side of the latter, and since the frequency modulated luminance signal $Y_{FM}$ is not additionally processed at all and is recorded in tracks $T_Y$ separate from the tracks $T_C$ receiving the audio and color difference signals, the apparatus according to this invention avoids distortion of the luminance signal which primarily determines picture quality.

Furthermore, in apparatus according to this invention, 4-channel audio recording can be realized if the recording of the audio signals $A'_{LFM}$ and $A'_{RFM}$ in the slant tracks $T_C$, as described above with reference to FIG. 6, is supplemented by the recording of two additional audio signals AL' and AR' in the longitudinal tracks $T_L$ and $T_R$, as previously described with reference to the prior art apparatus of FIG. 1. Thus, as shown on FIG. 6, the additional audio signals $A_L$, and $A_R$, may be supplied to frequency modulators $9_L$ and $9_R$ for frequency modulating suitable carriers, whereupon, the resulting frequency modulated additional audio signals are passed through respective recording amplifiers $10_L$ and $10_R$ to fixed heads $N_{AL'}$ and $H_{AR'}$, respectively, for recording by such fixed heads in tracks $T_L$ and $T_R$ extending longitudinally along the tape 4, as shown in FIG. 2.

Although, in the specific embodiment of this invention described above, the audio signals $A_L$ and $A_R$ frequency modulate carriers with frequencies of 1.53 MHz and 1.83 MHz, respectively, whereupon the carrier frequencies are frequency converted to 334.35 kHz and 633.30 kHz, as by converters $26_L$ and $26_R$, respectively, it should be understood that the audio signals $A_L$ and $A_R$ may directly frequency modulate carriers having frequencies of 334.35 kHz and 633.30 kHz, respectively.

Having specifically described a preferred embodiment of this invention with reference to the accompanying drawings, it is to be understood that the invention is not limited to that precise embodiment and that various changes and modifications may be effected therein by one skilled in the art without departing from the scope or spirit of the invention as defined in the appended claims.

What is claimed is:

1. In an apparatus for recording, in successive parallel tracks on a record medium, an audio signal and a color video signal comprised of a luminance signal and a chrominance signal constituted by at least two chrominance signal components, and in which said luminance and chrominance signals are recorded in alternate tracks, respectively, with said chrominance signal components being time-base-compressed and time-division-multiplexed so as to be arranged alternately in sequence in the respective tracks; the combination of:

first frequency modulating means for frequency modulating at least one carrier by said audio signal and providing an uninterrupted first frequency modulated output in a predetermined frequency band;

second frequency modulating means for frequency modulating a second carrier by said time-base-compressed and time-division-multiplexed chrominance signal components and providing a second frequency modulated output in a frequency band above said predetermined frequency band;

luminancy signal processing means for processing said luminance signal and providing a processed luminance signal therefrom;

mixing means for frequency multiplexing said first and second frequency modulated outputs;

first recording means receiving said processed luminance signal for recording the latter in the respective ones of said alternate tracks; and second recording means receiving the frequency multiplexed first and second frequency modulated outputs from said mixing means for recording in the others of said alternate tracks.

2. Apparatus according to claim 1; in which said audio signal includes right-channel and left-channel audio signal portions; and first frequency modulating means includes one frequency modulator which frequency modulates said one carrier by said right-channel audio signal portion for providing one uninterrupted frequency modulated audio output, and another frequency modulator which frequency modulates another carrier by said left-channel audio signal portion for providing another uninterrupted frequency modulated audio output, said one frequency modulated audio output and said other frequency modulated audio output having different frequency bands which are within said predetermined frequency band of the first frequency modulated output; and said mixing means receives both said one frequency modulated audio output and said other frequency modulated audio output for frequency multiplexing, as said first frequency modulated output, with said second frequency modulated output.

3. Apparatus according to claim 2; in which said mixing means frequency multiplexes said first and second frequency modulated outputs such that the level of said second frequency modulated output in the frequency multiplexed output is substantially greater than the levels of said one frequency modulated audio output and said other frequency modulated audio output in said first frequency modulated output.

4. Apparatus according to claim 2; further comprising high pass filter means interposed between said second frequency modulating means and said mixing means and having a cutoff frequency higher than said predetermined frequency band of the first frequency modulated output.

5. Apparatus according to claim 2; in which the record medium is in the form of a magnetic tape helically wrapped about at least a portion of the periphery of a rotary guide drum; and said first and second recording means include first and second rotary magnetic heads, respectively, disposed adjacent each other on said rotary guide drum and scanning obliquely across said tape along said alternate tracks, respectively.

6. Apparatus according to claim 5; further comprising third recording means for also recording said right- and left-channel audio signal portions in respective tracks extending longitudinally along said tape.

7. Apparatus according to claim 2; in which one frequency converter is interposed between said one frequency modulator and said mixing means and another frequency converter is interposed between said other frequency modulator and said mixing means; said one frequency modulator and said other frequency modulator have respective center frequencies substantially above said predetermined frequency band of the first frequency modulated output; and said one frequency converter and said other frequency converter lower the frequency bands of the outputs of said one frequency converter and said other frequency converter to within said predetermined frequency band.

8. In an apparatus for recording and/or reproducing, in successive parallel tracks on a record medium, an audio signal and a color video signal comprised of a luminance signal and a chrominance signal constituted by at least two chrominance signal components, and in which said luminance and chrominance signals are recorded in alternate tracks, respectively, with said chrominance signal components being time-based-compressed and time-division-multiplexed so as to be arranged alternately in sequence in the respective tracks; the combination of a recording section operative in a recording mode and comprising:

first frequency modulating means for frequency modulating at least one carrier by said audio signal and providing an uninterrupted first frequency modulated output in a predetermined frequency band;

second frequency modulating means for frequency modulating a second carrier by said time-based-compressed and time-division-multiplexed chrominance signal components and providing a second frequency modulated output in a frequency band above said predetermined frequency band;

luminance signal processing means for processing said luminance signal and providing a processed luminance signal therefrom;

mixing means for frequency multiplexing said first and second frequency modulated outputs;

first head means operative, in said recording mode, to receive said processed luminance signal for recording the latter in the respective ones of said alternate tracks; and second head means operative, in said recording mode, to receive the frequency multiplexed and second frequency modulated outputs from said mixing means for recording in the others of said alternate tracks;

and a reproducing section, operative in a reproducing mode, to cause said first and second head means to reproduce said processed luminance signal and said frequency multiplexed first and second frequency modulated outputs from the respective tracks on said record medium and comprising first frequency demodulating means for demodulating said audio signal from the first frequency modulated output reproduced by said second head means;

high pass filter means for separating said second frequency modulated output reproduced by said second head means;

second frequency demodulating means for demodulating said time-base-compressed and time-division-multiplexed chrominance signal components from said second frequency modulated output reproduced by said second head means;

demultiplexing and expanding means for deriving said chrominance signal components from the demodulated output of said second frequency demodulating means; and reproduced luminance signal processing means for deriving the luminance signal from the reproduced output of said first head means.

9. Apparatus according to claim 8; in which said audio signal includes right-channel and left-channel audio signal portions; said first frequency modulating means includes one frequency modulator which frequency modulates said one carrier by said right-channel audio signal portion for providing one frequency modulated audio output, and another frequency modulator which frequency modulates another carrier by said left-channel audio signal portion for providing another frequency modulated audio output, said one frequency modulated audio output and said other frequency modulated audio output having different frequency bands which are within said predetermined frequency band of the first frequency modulated output; and said mixing means receives both said one frequency modulated audio output and said other frequency modulated audio output for frequency multiplying, as said first frequency modulated output, with said second frequency modulated output; and in which said reproducing section further comprises first and second band pass filters for respectively separating said one frequency modulated audio output and said other frequency modulated audio output from said first frequency modulated output reproduced by said second head means; and said first frequency demodulating means includes two demodulators respectively receiving outputs of said first and second band pass filters and frequency demodulating therefrom said right-channel and left-channel audio signal portions, respectively.

10. Apparatus according to claim 9; in which said mixing means frequency multiplexes said first and second frequency modulated outputs such that the level of said second frequency modulated output in the frequency multiplexed output from said mixing means is substantially greater than the levels of said one frequency modulated audio output and said other frequency modulated audio output in said first frequency modulated output.

11. Apparatus according to claim 9; further comprising high pass filter means interposed between said second frequency modulating means and said mixing means and having a cutoff frequency higher than said predetermined frequency band of the first frequency modulated output.

* * * * *